US005343961A

United States Patent [19]

Ichikawa

[11] Patent Number: 5,343,961

[45] Date of Patent: Sep. 6, 1994

[54] POWER TRANSMISSION MECHANISM OF POWER-DRIVEN ROTARY TOOLS

[75] Inventor: Kiyotaka Ichikawa, Okazaki, Japan

[73] Assignee: Makita Corporation, Anjo, Japan

[21] Appl. No.: 969,481

[22] Filed: Oct. 30, 1992

[30] Foreign Application Priority Data

Oct. 31, 1991 [JP] Japan .............................. 3-097774[U]

[51] Int. Cl.[5] .............................................. B23B 45/16

[52] U.S. Cl. ....................................... 173/48; 173/178

[58] Field of Search .................... 173/48, 47, 217, 216, 173/213, 176, 178; 192/56 R

[56] References Cited

U.S. PATENT DOCUMENTS

| | | | |
|---|---|---|---|
| 3,494,429 | 2/1970 | Amtsberg et al. | 173/178 |
| 3,799,275 | 3/1974 | Plattenhardt et al. | 173/48 |
| 3,809,168 | 5/1974 | Fromm | 173/48 |
| 4,161,242 | 7/1979 | Moores, Jr. et al. . | |
| 4,232,749 | 11/1980 | Rohrback | 173/48 |
| 4,418,766 | 12/1983 | Grossmann | 173/48 |
| 4,428,438 | 1/1984 | Holzer | 173/48 |
| 4,823,885 | 4/1989 | Okumura . | |

FOREIGN PATENT DOCUMENTS 256512 4/1990 Japan .

*Primary Examiner*—Scott A. Smith

*Attorney, Agent, or Firm*—Lahive & Cockfield

[57] ABSTRACT

The present invention provides a power-driven rotary tool having an improved power transmission mechanism which has little frictional resistance against a spindle rotatable about and reciprocating along a longitudinal axis. The power-driven rotary tool of the invention includes: a spindle rotatably mounted in a housing for receiving rotation of a transmission shaft; a fixed clutch member idly rotatably mounted on the spindle; a movable clutch member mounted on the spindle to face the fixed clutch cam; a coil spring for pressing the movable clutch member towards the fixed clutch member; and a motor for rotating the fixed clutch member. The spindle has three ball spline grooves and the movable clutch member has three ball grooves. The movable clutch member is coupled with the spindle to be rotatable integrally therewith and reciprocate along a longitudinal axis via three balls. The tool further includes an impact mechanism disposed on the rear end of the spindle for imparting axial reciprocating movement to the spindle. The impact mechanism includes a fixed cam member being fixed to the housing and having a cam face on the front end thereof; and a movable cam member being mounted on the spindle to be rotatable with the spindle and having a cam engagement face for slidably engaging with the cam face of the fixed cam member.

5 Claims, 9 Drawing Sheets

POWER TRANSMISSION MECHANISM OF POWER-DRIVEN ROTARY TOOLS

BACKGROUND OF THE INVENTION

1. Field of the Invention

The present invention relates to a power transmission mechanism of power-driven rotary tools such as drills and screwdrivers, and more particularly to a power transmission mechanism for imparting reciprocating movement as well as rotation.

2. Description of the Related Art

Power-driven drills, screwdrivers, and other rotary tools have a mechanism for transmitting power from a driving mechanism to a rotary output shaft. Examples of such transmission mechanisms include: a clutch cam arrangement being axially movable via a pin inserted through a transmission shaft in a direction perpendicular to its axis as disclosed in Japanese Utility Model Laying-Open Gazette No. Sho-63-30476; and another clutch cam arrangement being axially movable via a spline mounted on a rotary output shaft as disclosed in Japanese Utility Model Laying-Open Gazette No. Hei-2-56512.

A power-driven combination drill and screwdriver having a clutch arrangement is also known as disclosed in U.S. Pat. Nos. 4,161,242 and 4,823,885.

Conventional power-driven rotary tools including the combination tool mentioned above, however, do not have function of reciprocation; that is, the transmission shaft and the output shaft are not axially movable. Another vibration drill is thus required for making holes in bricks or concrete.

When an impact mechanism for imparting axial reciprocation to the output shaft is mounted on the power-driven rotary tool to move the output shaft along the axis, reciprocation of the output shaft further moves the clutch cam relative to the output shaft and thereby causes untimely abrasion and wear of the clutch cam. Namely, the sliding friction undesirably shortens the life of the power transmission mechanism. Frictional resistance also prevents smooth reciprocating movement of the output shaft. Especially in a battery-powered tool, the loading badly consumes the battery and shortens the possible life thereof.

SUMMARY OF THE INVENTION

One object of the invention is accordingly to provide a power-driven rotary tool having impact drill mode, impact driver mode, normal drill mode, and normal driver mode.

Another object of the invention is to provide an improved power transmission mechanism of power-driven rotary tools, which efficiently imparts both rotation and reciprocation.

A further object of the invention is to reduce frictional resistance of a power transmission mechanism against a spindle or output shaft during reciprocating movement.

The above and other related objects are attained by a power-driven rotary tool according to the invention, which includes: a splittable housing; a motor mounted in the housing; change gear means mounted on a transmission shaft to be coupled with an output shaft of the motor; a spindle being rotatably mounted in the housing for receiving rotation of the transmission shaft, and having an end to which a tool implement is replaceably and detachably attached; torque adjusting clutch means operatively mounted on the spindle; and impact means disposed on the rear end of the spindle for imparting axial reciprocating movement to the spindle.

The torque adjusting clutch means further includes: a spring; a fixed clutch member mounted on the spindle to be idly rotatable but not movable along a longitudinal axis; and a movable clutch member mounted on the spindle to face the fixed clutch member, the movable clutch member supporting a first end of the spring and being rotatable integrally with the spindle and movable along the longitudinal axis. The power-driven rotary tool further includes manually rotatable selector ring means mounted on the front end of the housing for supporting a second end of the spring of the torque adjusting clutch means to adjust the amount of compression of the spring and thereby the torque. The tool is changed between driver mode and drill mode through rotation of the selector ring means.

The impact means further includes: a fixed cam member being fixed to the housing and having a cam face on the front end thereof; and a movable cam member being mounted on the spindle to be rotatable with the spindle and having a cam engagement face for slidably engaging with the cam face of the fixed cam member. The power-driven rotary tool of the invention further includes selecting means to change the movable cam member between a first position at which the cam engagement face is not in contact with the cam face and the spindle does not move along the longitudinal axis and a second position at which the cam engagement face is in contact with the cam face and the spindle moves along the longitudinal axis.

The tool of the invention further includes reduction gear means for imparting rotation of the motor to the change gear means. In the power-driven rotary tool, the selector ring means, the torque adjusting clutch means, the impact means, and the reduction gear means have substantially coaxial arrangement and are coupled to one another in this order. The change gear means is disposed below the impact means and the reduction gear means.

The axially movable spindle has one or plural ball spline grooves, and the movable clutch member has one or plural ball grooves corresponding to the ball spline grooves. The movable clutch member is coupled with the spindle to be rotatable integrally therewith and reciprocate along the longitudinal axis via one or plural balls. Each ball rolls in a space defined by the ball groove and the ball spline groove. The movable clutch member is pressed towards the fixed clutch member by the spring.

When the spindle reciprocates, the movable clutch member moves along the longitudinal axis relative to the spindle via the ball. The rolling contact of the clutch member with the spindle has little frictional resistance and does not cause severe abrasion. In the battery-driven tools, this arrangement greatly reduces consumption of the battery and extends the life thereof.

These and other objects, features, aspects, and advantages of the present invention will become more apparent from the following detailed description of the preferred embodiment with the accompanying drawings.

DESCRIPTION OF THE PREFERRED EMBODIMENT

A power-driven rotary tool having a power transmission mechanism embodying the invention is described according to the drawings.

Figure 1:
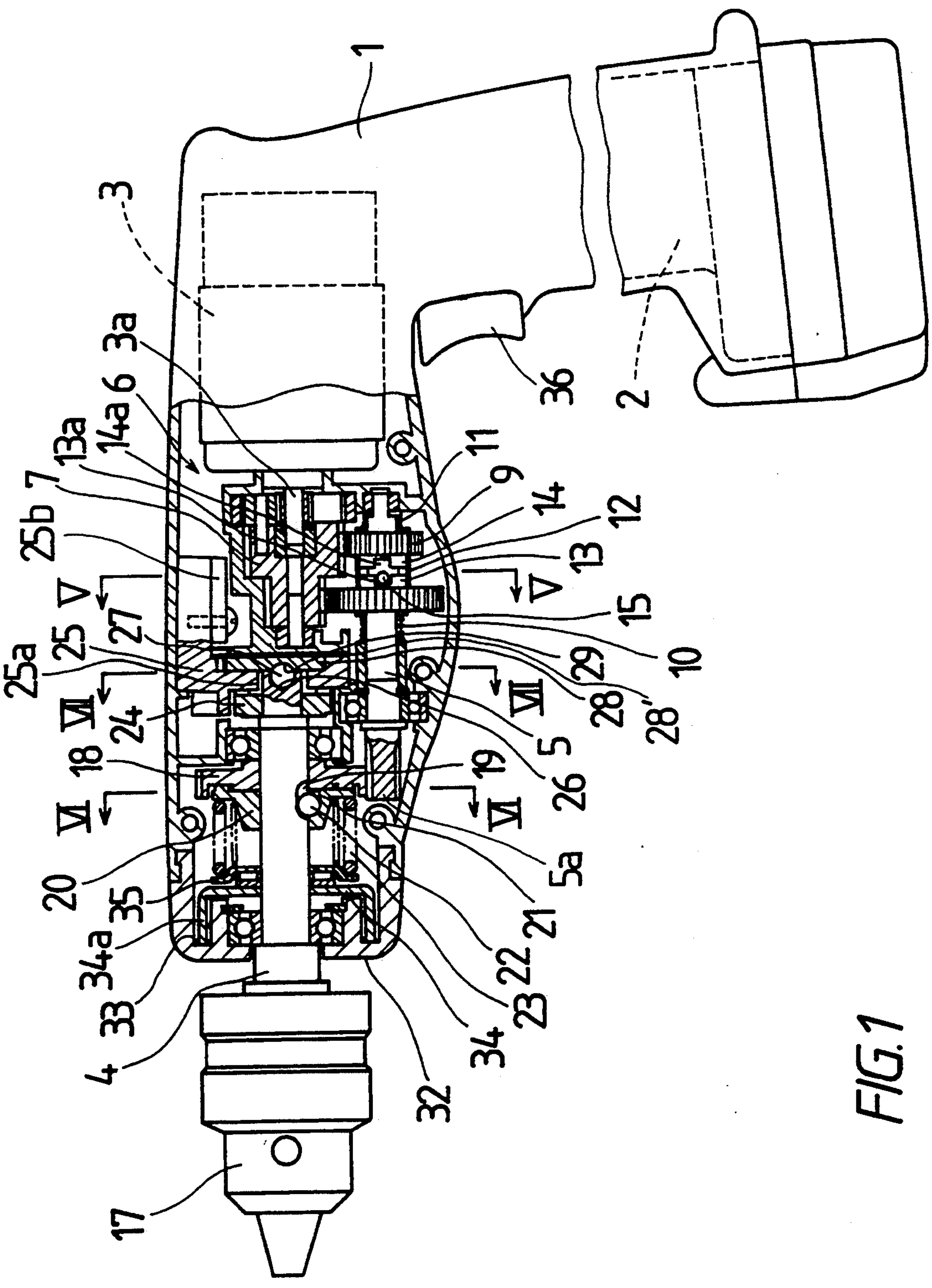
FIG. 1 is a partly broken side view showing structure of a power-driven rotary tool embodying the invention in impact driver mode.

The power-driven tool includes, as illustrated in FIG. 1, a pistol grip housing 1 having a pair of complementary mating halves which are detachably secured along the common longitudinal midplane. A battery 2 is replaceably mounted in the grip of the housing 1, and a driving and power transmission assembly is arranged in the housing 1 substantially perpendicular to the grip.

The driving and power transmission assembly includes: a motor 3 disposed in the rear portion of the housing 1; a spindle or output shaft 4 in the front portion; and a transmission shaft 5 in the lower mid-portion. Rotation of the motor 3 is transmitted to a driving shaft 7, which is rotatable coaxially with a motor shaft 3*a*, via a reduction gear mechanism 6 including a planetary pinion. The driving shaft 7 includes a front gear unit of a smaller diameter and a rear gear unit of a larger diameter. The transmission shaft 5 rotatably extending below and parallel to the driving shaft 7 has a front transmission gear 8 of a larger diameter and a rear transmission gear 9 of a smaller diameter, which are idly fitted to engage with the front gear unit and the rear gear unit of the driving shaft 7, respectively. The transmission shaft 5 further includes a gear 5*a* fitted on the front end thereof.

Figure 5:
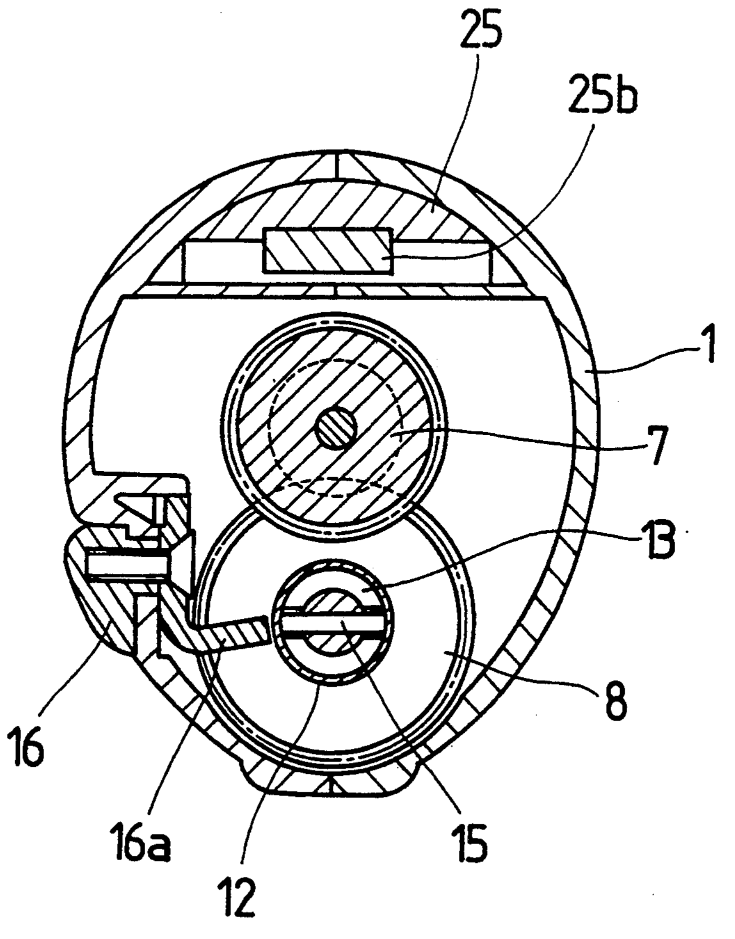
FIG. 5 is a cross sectional view showing a change gear mechanism taken on the line of V—V of FIG. 1.

The front and rear transmission gears 8 and 9 are respectively pressed rearward and frontward by coil springs 10 and 11 while having a fixed space ensured by a spacer 12 inserted therebetween. Ring bodies 13 and 14 are respectively attached to the rear face of the front transmission gear 8 and the front face of the rear transmission gear 9 so as to be opposed to each other. The ring bodies 13 and 14 have notches 13*a* and 14*a* formed to face each other. As clearly seen in the cross section view of FIG. 5, a pin 15 being transversely inserted through the transmission shaft 5 is fitted in either of the notches 13*a* and 14*a* when sliding operation of a change gear switch 16 moves the transmission gears 8 and 9 along the horizontal axis via an operation pin 16*a*. Rotation of the driving shaft 7 is accordingly transmitted to the transmission shaft 5 through one of the transmission gears 8 or 9 while the other transmission gear 9 or 8 is idly rotated.

The output shaft 4 rotatable around and movable along the longitudinal axis has a chuck 17 mounted on the front end thereof projecting from the housing 1. A fixed clutch cam 18 idly fitted at a predetermined position of the output shaft 4 has teeth on its circumference, which engage with the teethed surface of the front end gear 5*a* of the transmission shaft 5. The driving and power transmission assembly including the motor 3, the reduction gear mechanism 6, and the transmission shaft 5 imparts driven rotation to the fixed clutch cam 18.

Figure 6:
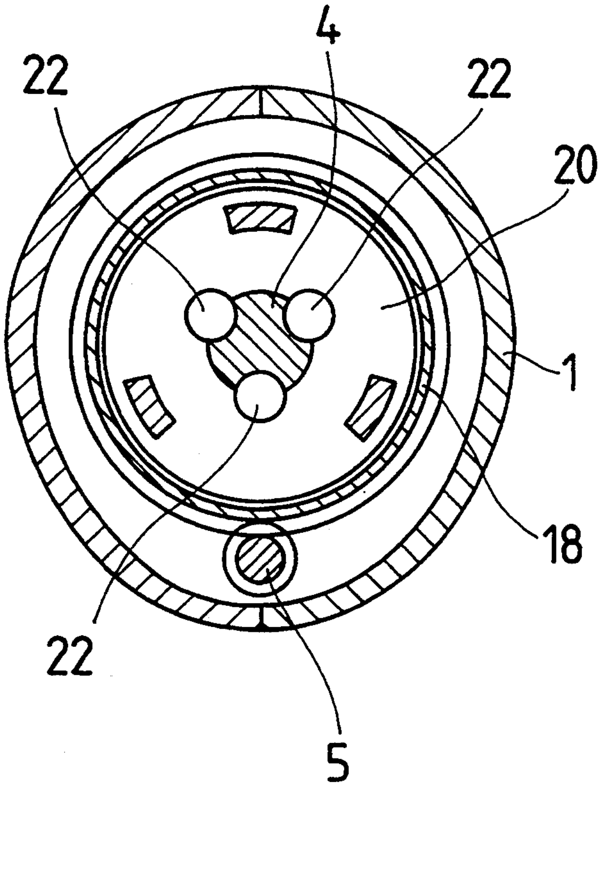
FIG. 6 is a cross sectional view showing a power transmission mechanism taken on the line of VI—VI of FIG. 1.

The output shaft 4 also has three ball spline grooves 19 extending forward from the predetermined position at which the fixed clutch cam 18 is idly fitted. A movable clutch cam 20 mating with the fixed clutch cam 18 is fitted to the portion of the output shaft 4 having the ball spline grooves 19. The movable clutch cam 20 is coupled with the output shaft 4 to be rotatable integrally therewith via three ball grooves 21 and steel balls 22 as clearly seen in the cross sectional view of FIG. 6. The ball grooves 21 are formed on the opposing surface of the movable clutch cam 20 corresponding to the ball spline grooves 19, and each ball 22 rolls in a space defined by the ball groove 21 and the ball spline groove 19. The movable clutch cam 20 is also movable along the longitudinal axis and is pressed towards the fixed clutch cam 18 by coil springs 23. When the movable clutch cam 20 moves forward against the coil springs 23 in impact mode (described later), the steel balls 22 have rolling contact with the ball spline grooves 19 and the ball grooves 21, thus preventing untimely abrasion of the grooves 19 and 21. The symmetrical arrangement of the three balls and grooves enhances smooth reciprocating movement of the output shaft 4. The power transmission mechanism thus constructed efficiently imparts rotation of the transmission shaft 5 to the output shaft 4.

An impact mechanism for imparting axial reciprocating motion to the output shaft 4 is disposed on the rear portion of the output shaft 4 as shown in FIGS. 1 through 4 and FIGS. 7A and 7B. The impact mechanism includes: a rotatable cam plate 24 formed as a flange of the output shaft 4; and a fixed cam plate 25 secured to the housing 1. The fixed cam plate 25 has an opening 25*a* to accommodate the output shaft 4 and an exothermic element 25*b* for controlling the rotating speed of the output shaft. A cam face of the fixed cam plate 25 is arranged opposite to a cam engagement face of the rotatable cam plate 24. Engagement of the cam surface of the fixed cam plate 25 with the cam engagement face of the rotatable cam plate 24 imparts axial reciprocation to the output shaft 4.

A hemispherical recess 26 is formed on the rear end face of the output shaft 4 which is inserted into the opening 25*a* of the fixed cam plate 25. A large portion of a steel ball is accommodated in the hemispherical recess 26. A shifter plate 28 disposed on the rear side of the fixed cam plate 25 is in contact with the rear end face of the output shaft 4 to be slidable perpendicular to the longitudinal axis. The shifter plate 28 is further supported by a steel plate 28'. The shifter plate 28 also has a recess 29 which can accommodate the exposed or non-accommodated portion of the steel ball 27. A push button 28*a* projecting from both sides of the shifter plate 28 is changed between impact mode and normal mode.

Figure 2:
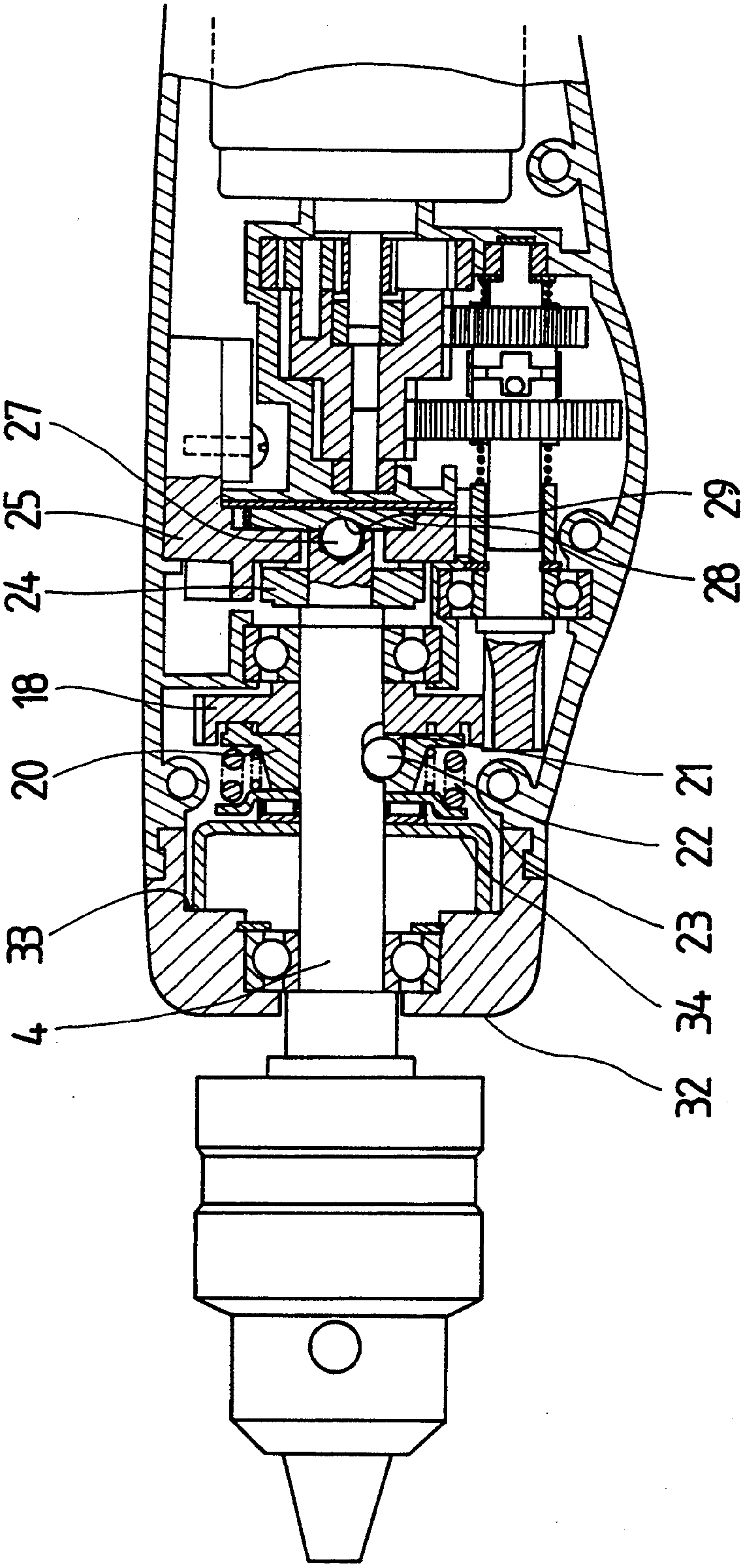
FIG. 2 is an enlarged view showing the power-driven rotary tool of FIG. 1 in impact drill mode.
Figure 7A:
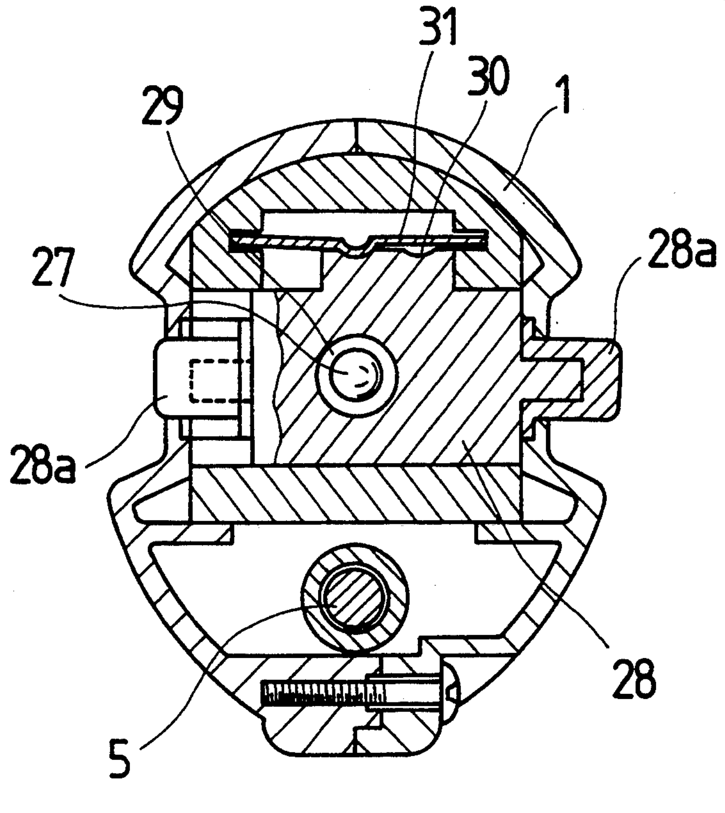
FIG. 7A is a cross sectional view showing an impact mechanism in impact mode taken on the line of VII—VII of FIG. 1.

In impact mode, as shown in FIGS. 1 and 2 and FIG. 7A, the exposed portion of the steel ball 27 is accommodated in the recess 29 of the shifter plate 28, so that the rotatable cam plate 24 and the fixed cam plate 25 are brought into contact with each other. The engagement of the rotatable cam plate 24 with the fixed cam plate 25 transmits reciprocating motion to the output shaft 4.

Figure 3:
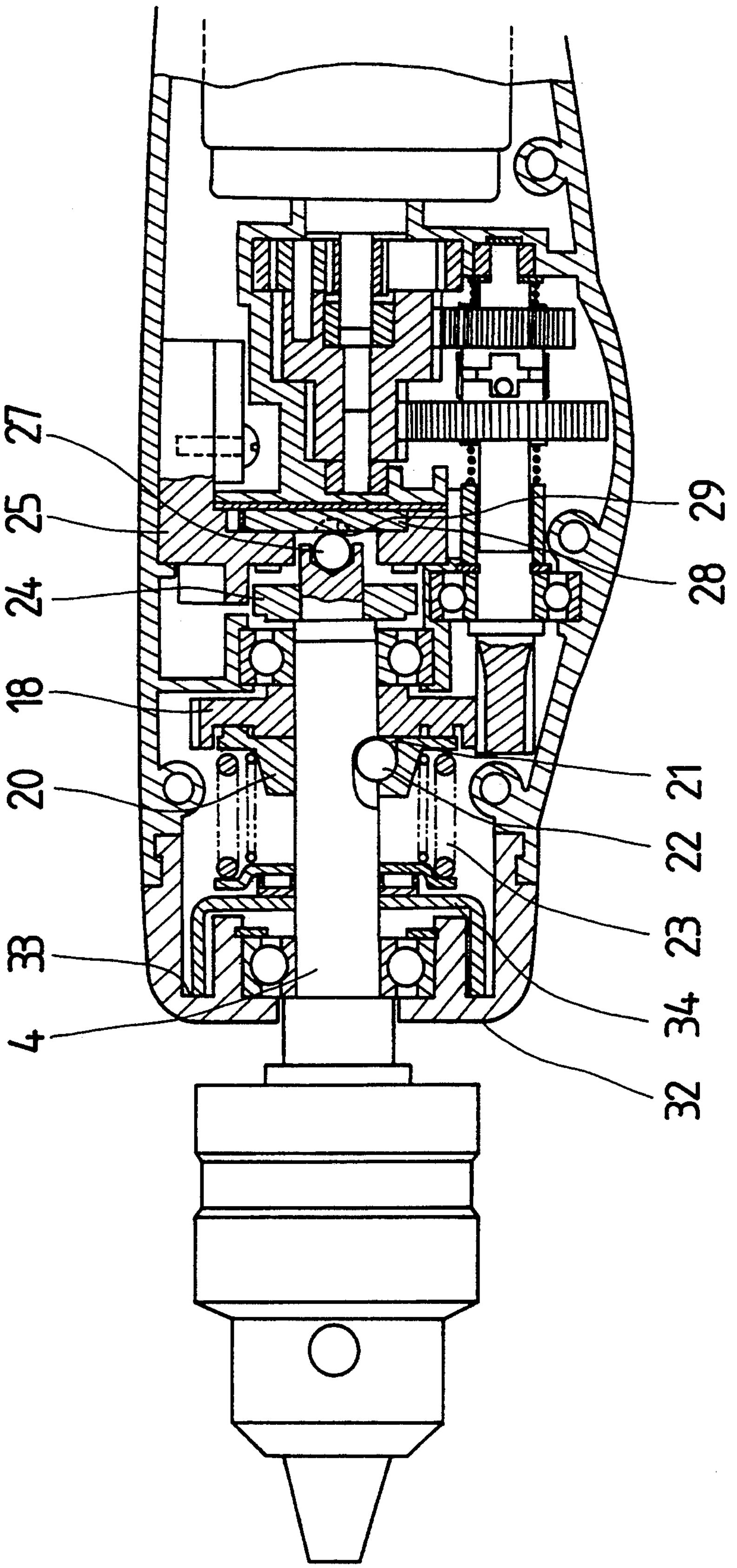
FIG. 3 is an enlarged view showing the power-driven rotary tool of FIG. 1 in normal driver mode.
Figure 4:
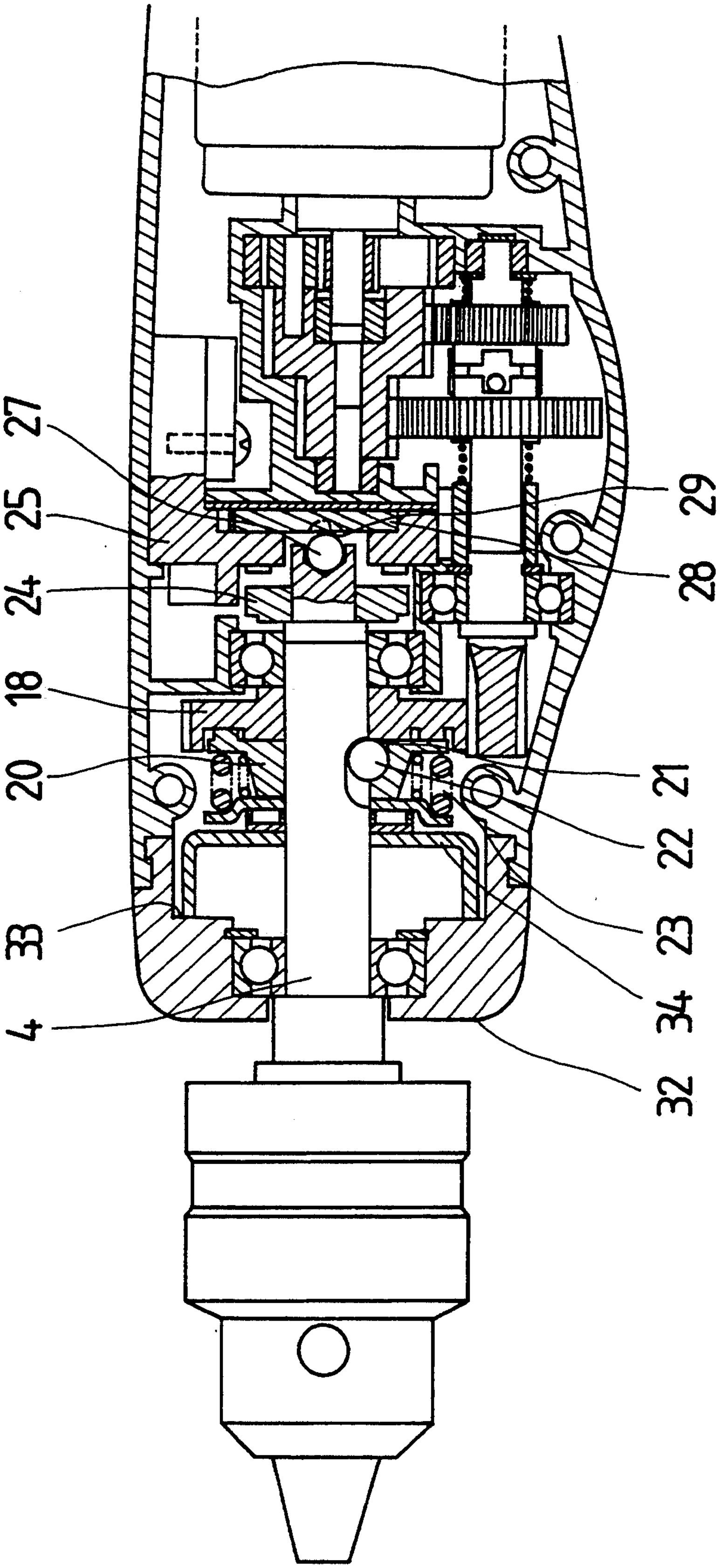
FIG. 4 is an enlarged view showing the power-driven rotary tool of FIG. 1 in normal drill mode.
Figure 7B:
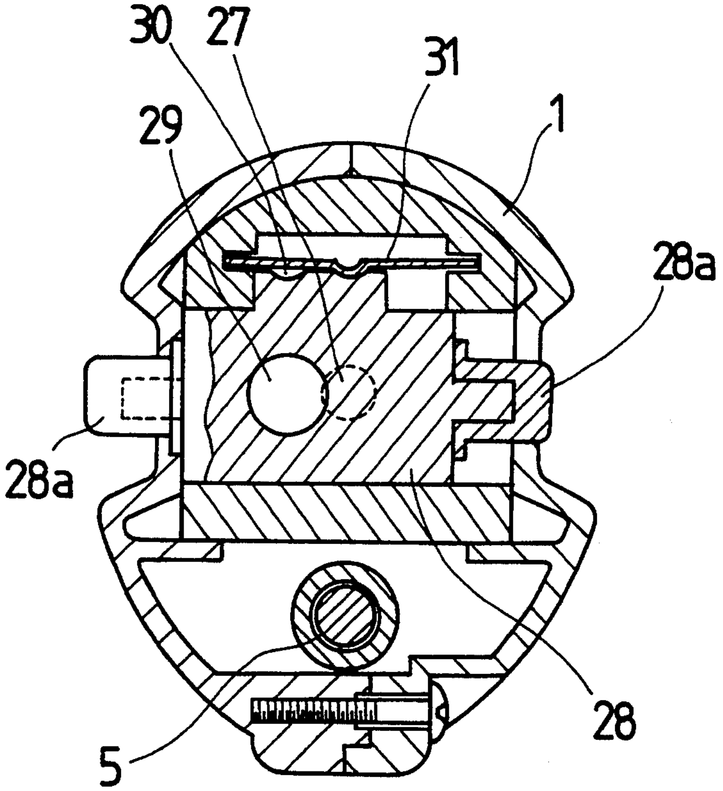
FIG. 7B is a cross sectional view showing the impact mechanism of FIG. 7A in normal mode.

On the other hand, in normal mode, as shown in FIGS. 3 and 4 and FIG. 7B, the exposed portion of the steel ball 27 is pushed out of the recess 29 through sliding motion of the shifter plate 28 with the push button 28*a*, and the output shaft 4 is pushed forward to cut the contact of the movable cam plate 24 with the fixed cam plate 25.

A leaf spring 31 with a click is fitted in either of hemispherical notches 30 formed on one side of the shifter plate 28, so that the position of the steel ball 27 is securely determined relative to the recess 29 of the shifter plate 28 corresponding to the operation of the push button 28*a*.

Figure 8:
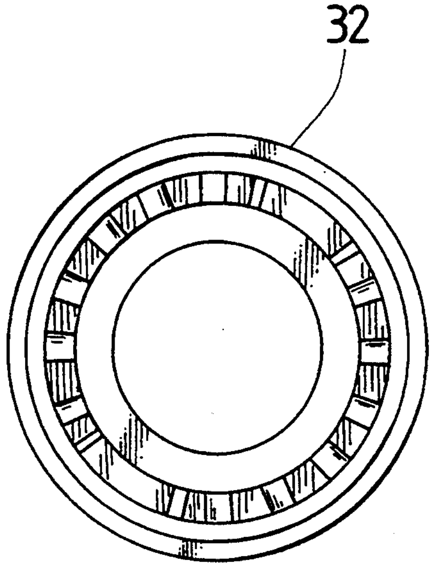
FIG. 8 is a rear view of a torque adjusting ring.
Figure 9:
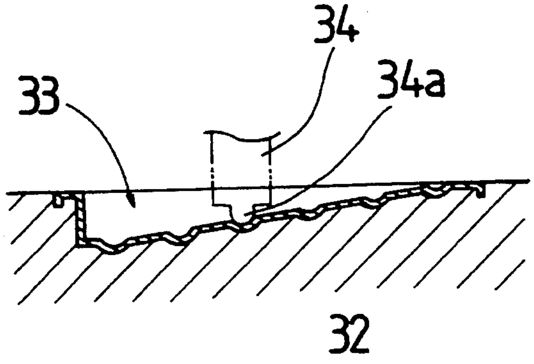
FIG. 9 is an explanatory view showing the step-like adjusting groove of the torque adjusting ring.

The front end of the output shaft 4 is projected from the center of a torque adjusting ring 32 which is manually rotatably mounted on the front end of the housing 1. FIG. 8 is a rear view of the torque adjusting ring. Step-like adjusting grooves 33 shown in FIG. 9 are formed on the inner face of the torque adjusting ring 32 along the circumference of the output shaft 4. A pair of projections 34*a* of a slider 34 idly fitted to the output shaft 4 are pressed against the adjusting grooves 33 by the reaction force of the coil springs 23, which apply pressing force to the movable clutch cam 20, transmitted via a slider plate 35 also idly fitted to the output shaft 4. Rotation of the torque adjusting ring 32 successively brings the projections 34*a* into contact with the step-like adjusting grooves 33 and changes the position of the slider 34. The positional change of the slider 34 subsequently changes the pressing force of the coil springs 23 against the movable clutch cam 20. This works as a torque limiter to the transmission mechanism of the clutch cam, accordingly.

When it is desired to shift the power-driven tool from the driver mode shown in FIG. 1 or FIG. 3 to the drill mode shown in FIG. 2 or FIG. 4, the operator rotates the torque adjusting ring 32 to cause the slider 34 to be moved axially so as to restrict the axial movement of the movable clutch cam 20. More specifically, in the drill mode, the coil springs 23 are contracted and the torque limiter is released, and in the driver mode, the coil springs 23 are restored and the torque limiter works.

The change gear switch 16 for axial movement of the transmission gears 8 and 9, the push button 28*a* for changing between impact mode and normal mode, and a power switch 36 for turning the motor 3 on and off are attached to the housing 1 to be manually accessible. The power switch 36, the battery 2, and the motor 3 are electrically connected to one another.

When the operator turns on the power-driven tool with the power switch 36 after selecting a desirable rotating speed with the change gear switch 16, rotation of the motor 3 is transmitted through the reduction gear mechanism 6, the transmission gears 8 and 9, and the transmission shaft 5 to the fixed clutch cam 18. When normal driver mode is selected with the push button 28*a*, the output shaft 4 is pushed forward to cut the contact of the rotatable cam plate 24 with the fixed cam plate 25. The steel balls 22 are brought into contact with the rear end of the ball spline grooves 19, and rotation of the fixed clutch cam 18 is imparted to the output shaft 4 via the movable clutch cam 20.

On the other hand, when the impact mode is selected with the push button 28*a*, the exposed portion of the steel ball 27 is accommodated in the recess 29 of the shifter plate 28. Here the output shaft 4 moves backward, and the rotatable cam plate 24 and the fixed cam plate 25 are brought into contact with each other. The engagement of the rotatable cam plate 24 with the fixed cam plate 25 transmits reciprocating motion as well as rotation to the output shaft 4. Although reciprocating motion moves the output shaft 4 relative to the movable clutch cam 20, the steel balls 22 rolling in the ball spline grooves 19 and the ball grooves 21 reduce the frictional resistance and prevents uneven rotation.

As described above, in the power-driven rotary tool of the invention, the impact mechanism is arranged between the clutch cam mechanism and the reduction gear mechanism. This arrangement not only downsizes the whole tool but improves the operatability thereof since the change gear switch and the impact-normal mode selector means are disposed in the vicinity of the power switch. The arrangement of the impact mechanism on the approximate center of the tool allows the fixed cam plate to be sufficiently large, thus preventing excessive heat of the cam plate due to sliding of the cam plates. The impact mechanism is favorably stable in axial reciprocating motion.

The reduction gear mechanism, the change gear means, the clutch cam mechanism, and the impact mechanism are mounted in the splittable housing. Various elements of each mechanism, and especially the rotatable and fixed cam plates, are easily replaceable.

The power-driven tool of the invention has a reciprocating function called an impact mode in addition to the conventional drill and driver functions, thus being usable for various works including forming holes in bricks and concrete.

It is clearly understood that the above embodiment is only illustrative and not restrictive in any sense since the invention may be embodied in other forms without departing from the scope or spirit of essential characteristics thereof. For example, the reduction gear mechanism and the transmission mechanism may have any known structure other than that described in the above embodiment. The spirit and scope of the present invention is limited only by the terms of the appended claims.

What is claimed is:

1. A compact power-driven rotary tool including a spindle having a front end and a rear end and extending along a longitudinal axis, said spindle being alternately disposable between an impact mode to allow for both a rotating movement and a reciprocating movement of said spindle, and a non-impact mode to allow only a rotating movement of said spindle, said tool comprising a splittable housing including a front end and a rear end and being split along said longitudinal axis, motor means mounted substantially in said housing rear end having a rotatable output shaft with a selected rotational speed and extending therefrom along said longitudinal axis, force transmission means extending substantially parallel to said motor output shaft and associated therewith for receiving and transmitting said rotation of said motor output shaft, said transmission means including change gear means for changing the rotational speed of said motor output shaft, said spindle being rotatably mounted in said housing front end for receiving said rotation of said transmission means, and having a front end to which a tool implement is replaceably and detachably attached, impact means disposed on said rear end of said spindle for imparting a reciprocating movement along said longitudinal axis to said spindle, and clutch means, mounted on said spindle between said front and rear ends and axially spaced from said impact means along said axis, said clutch means including spring means having a first end and extending along said longitudinal axis, a rotatable first clutch member mounted on said spindle and rotatably coupled to said transmission means, said first clutch member being free of movement along said longitudinal axis, and a movable second clutch member movable along said longitudinal axis and mounted on said spindle, and having a first face and a second face, said first face being placed in intimate facing contact with said first clutch member by said spring means, said movable clutch member second face supporting said first end of said spring means, wherein said spindle includes one or more ball spline grooves formed thereon and having one or more rotatable balls received therein, respectively, said movable clutch member of said clutch means having one or more ball grooves formed thereon at a location substantially complementary to said one or more ball spline grooves, said one or more balls slidably coupling said second clutch member and said first clutch member with said spindle for allowing said second clutch member to rotate and reciprocatingly move along said longitudinal axis in response to a rotating movement and a reciprocating movement of said spindle.

2. The rotary tool of claim 1, wherein each of said one or more ball spline grooves extends along said longitudinal axis and has a slot-like shape having a front end and a rear end, each of said one or more balls being movable between a first position wherein said one or more balls are disposed in said rear end of said one or more ball spline grooves, and a second position wherein said one or more balls are disposed in said front end of said one or more ball spline grooves, each said one or more ball being movable between said first position and said second position by said impact means.

3. The rotary tool of claim 2 further comprising reduction gear means coupled to said motor means and said transmission means for transferring said rotation of said motor output shaft to said change gear means, wherein said impact means is disposed between said clutch means and said reduction gear means, and said change gear means being disposed below said impact means and said reduction gear means.

4. The rotary tool of claim 3, wherein said force transmission means includes a transmission shaft having said change gear means mounted thereon.

5. The rotary tool of claim 3, wherein said impact means includes a flange formed on said spindle rear end and having a first face, and a stationary cam mounted to said housing, and being placed in contact with said flange first face when said tool is disposed in said impact mode, and said stationary cam being free of said first face of said spindle rear end when said tool is disposed in said non-impact mode.

* * * * *